United States Patent
Foster et al.

(10) Patent No.: US 9,698,913 B2
(45) Date of Patent: Jul. 4, 2017

(54) SYSTEM AND METHOD FOR DISTORTION CORRECTION IN PHASE-ENCODED PHOTONIC LINKS

(71) Applicant: The John Hopkins University, Baltimore, MD (US)

(72) Inventors: Mark Foster, Baltimore, MD (US); Amit Bhatia, Baltimore, MD (US)

(73) Assignee: THE JOHN HOPKINS UNIVERSITY, Baltimore, MD (US)

( * ) Notice: Subject to any disclaimer, the term of this patent is extended or adjusted under 35 U.S.C. 154(b) by 15 days.

(21) Appl. No.: 14/733,360

(22) Filed: Jun. 8, 2015

(65) Prior Publication Data

US 2015/0358086 A1    Dec. 10, 2015

Related U.S. Application Data

(60) Provisional application No. 62/008,819, filed on Jun. 6, 2014.

(51) Int. Cl.
| | |
|---|---|
| *H04B 10/556* | (2013.01) |
| *H04B 10/2507* | (2013.01) |
| *H04B 10/2575* | (2013.01) |
| *H04B 10/50* | (2013.01) |
| *H04B 10/548* | (2013.01) |

(52) U.S. Cl.
CPC ..... *H04B 10/5561* (2013.01); *H04B 10/2507* (2013.01); *H04B 10/2575* (2013.01); *H04B 10/503* (2013.01); *H04B 10/548* (2013.01)

(58) Field of Classification Search
None
See application file for complete search history.

(56) References Cited

U.S. PATENT DOCUMENTS

| | | |
|---|---|---|
| 5,327,279 A | 7/1994 | Farina et al. |
| 6,246,500 B1 | 6/2001 | Ackerman |
| 8,103,178 B2 | 1/2012 | McKinney |
| 2003/0147116 A1* | 8/2003 | Shpantzer ........ H04B 10/25137 359/264 |
| 2009/0263144 A1 | 10/2009 | McKinney |
| 2014/0064734 A1 | 3/2014 | Witzens |

FOREIGN PATENT DOCUMENTS

| | | |
|---|---|---|
| EP | 0792069 A3 | 4/1998 |
| EP | 1056228 A2 | 11/2000 |

OTHER PUBLICATIONS

Myslivets, et al., Generation of Wideband Frequency Combs by Continuous-Wave Seeding of Multistage Mixers with Synthesized Dispersion, Optics Express, 2012, 20(3):3331-3344.

\* cited by examiner

*Primary Examiner* — Darren E Wolf
(74) *Attorney, Agent, or Firm* — Venable LLP; Henry J. Haley; Ilya Svetlov

(57) ABSTRACT

A phase-modulated optical link and methods are provided to suppress distortions in phase-encoded analog photonic links. The phase-modulated optical link includes a distortion compensation element. The distortion compensation element includes an optical comb generator that is seeded by a phase-encoded optical signal. The methods include generating an optical comb seeded by a portion of a phase-encoded optical signal and isolating desired peaks to be combined with a separate portion of the phase-encoded optical signal.

13 Claims, 16 Drawing Sheets
(13 of 16 Drawing Sheet(s) Filed in Color)

SYSTEM AND METHOD FOR DISTORTION CORRECTION IN PHASE-ENCODED PHOTONIC LINKS

CROSS-REFERENCE TO RELATED APPLICATIONS

This application claims priority to U.S. Provisional Patent Application No. 62/008,819, filed Jun. 6, 2014, the entire contents of which are incorporated herein in their entirety by reference.

STATEMENT REGARDING FEDERALLY SPONSORED RESEARCH

This invention was made with government support under N000141210730 awarded by the Office of Naval Research. The government has certain rights in the invention.

BACKGROUND OF THE INVENTION

The present disclosure relates to optical systems and methods. More particularly, the present disclosure is related to systems and methods for distortion correction in analog photonic links.

Due to their high bandwidth, low cost, reduced size, and immunity to electromagnetic interference, analog optical links present a desirable alternative to traditional RF or microwave cables. Notably, their first widespread application was in the cable broadcasting industry to distribute CATV signals. The low loss of optical fibers and the large distances between source and destination made it a logical choice to replace the lossy coaxial cables and the multitude of amplifiers they required. However, to gain greater acceptance across other applications, the fundamental performance of analog optical links needs improvement while maintaining an ultra-wide operating bandwidth. For instance, this may necessitate increasing spurious-free dynamic range (SFDR) while reducing loss and noise.

Generally, external intensity-modulated direct detection ("IMDD") links are the preferred method of transmitting an analog signal through fiber due to the inherent simplicity, where the receiver is just a photodiode. On the other hand, despite the additional receiver complexity, phase-modulated interferometrically detected ("ΦMID") links possess several distinct advantages over IMDD links, including simplicity at the transmit end, without need for biasing electronics, and balanced detection without necessitating duplex fiber spans. In particular, these are compelling advantages for radio-over-fiber and antenna remoting applications. However, while the phase modulation itself is highly linear, the non-linearity of the phase-modulation receiver produces third-order distortion, which limits the SFDR of the link.

Linearization of analog optical links involves modifying the transfer function (input voltage to output voltage) of the link to reduce one or more distortion products. In most analog optical links, the primary distortions are introduced by the transfer function of an interferometer. Specifically, in IMDD links employing Mach-Zehnder intensity modulators this occurs at the transmit end in the modulator whereas in ΦMID links it occurs at the receive end in the interferometric detector. The simplest linearization method involves biasing the interferometer at quadrature where the Taylor expansion of the transfer function is an odd function and thus all even-order distortions are eliminated. However, in links with less than an octave of bandwidth, the odd-order distortions are the most detrimental as their intermodulation products fall in band and thus cannot be filtered out. Thus in sub-octave links, third-order distortion poses the primary limit to the link's SFDR. Therefore reducing or eliminating third-order distortion is highly desirable. The simultaneous elimination of both the second-order and third-order distortions is known as broadband linearization and typically comes at the expense of higher noise.

There are three commonly employed methods of distortion elimination in analog photonic links: analog electronic (feedback/feedforward), digital signal processing, and electro-optic. One example of electronic distortion elimination is predistortion, in which an RF signal with equal and opposite nonlinearity to the transfer function is fed into the modulator. Another example is feed-forward, in which part of the optical output is detected and compared with the input RF signal to generate an error signal. This error signal is inverted and sent to a second electro-optic modulator whose output is added to the first output to produce a more linear output. The second type of distortion elimination involves detecting the output, sending it through an analog-to-digital converter, and using digital signal processing (DSP) to electronically correct the signal. The third type involves connecting multiple modulators or multiple interferometric detectors in either series or parallel to produce an output that is more linear than either of the devices individually. For example, this usually means driving one modulator with a high optical power and low RF power (low distortion) and the other with low optical power and high RF power (high distortion), then combining the signals such that the distortion products cancel while the signal does not, however, due to device constraints this linearization generally comes at the cost of significantly reduced link gain.

Hence, given the above, there is a need for systems and methods capable of reducing or eliminating distortion in phase-modulated analog photonic links while retaining sufficient link gain.

SUMMARY OF THE INVENTION

The present disclosure overcomes the aforementioned drawbacks by providing a system and method for optical distortion cancellation in phase-modulated analog-photonic links. Specifically, an approach is described for combining a phase-encoded signal with lines from an optical comb generated from the signal. Demonstrations are provided whereby third-order distortion is canceled and the link SFDR is increased by more than 18 dB.

In accordance with the present disclosure, a phase-modulated optical link includes a first light source, a second light source, a phase encoder, a splitter, a distortion compensation element, and a detector. The first light source includes a first light source output. The second light source includes a second light source output. The phase encoder includes a phase encoder input in optical communication with the first light source output, and further includes a signal input and a phase-encoded optical signal output. The splitter includes a splitter input in optical communication with the phase-encoded optical signal output, and further includes a first splitter output and a second splitter output. The splitter is adapted to receive a splitter optical signal at the splitter input and provide a first portion of the splitter optical signal at the first splitter output and a second portion of the splitter optical signal at the second splitter output. The distortion compensation element includes a first coupler, an optical comb generator, and a peak selector. The first coupler includes a first first coupler input in optical communication with the first splitter output and a second first coupler input in optical communication with the second light source output, and further includes a first coupler output. The optical comb generator includes an optical comb generator input in optical communication with the first coupler output, and further includes an optical comb generator output. The peak selector includes a peak selector input in optical communication with the optical comb generator output, and further including a peak selector output. The detector includes a first detector input in optical communication with the second splitter output and a second detector input in optical communication with the peak selector output, and further includes a signal output.

In accordance with the present disclosure, a phase-modulated optical link includes a phase encoder that receives a signal input and provides a phase-encoded optical signal, a phase-modulation detector, and a distortion compensation element comprising an optical comb generator that is seeded by the phase-encoded optical signal.

In accordance with the present disclosure, a method of compensating distortion in a phase-modulated optical link includes generating an optical comb seeded by a first portion of a phase-encoded optical signal, the optical comb including a plurality of peaks, isolating at least one of the plurality of peaks to produce a peak-selected optical comb, and combining the peak-selected optical comb with a second portion of the phase-encoded signal.

The foregoing and other aspects and advantages of the disclosure will appear from the following description. In the description, reference is made to the accompanying drawings which form a part hereof, and in which there is shown by way of illustration a preferred aspect of the disclosure. Such aspect does not necessarily represent the full scope of the disclosure, however, and reference is made therefore to the claims and herein for interpreting the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1A:
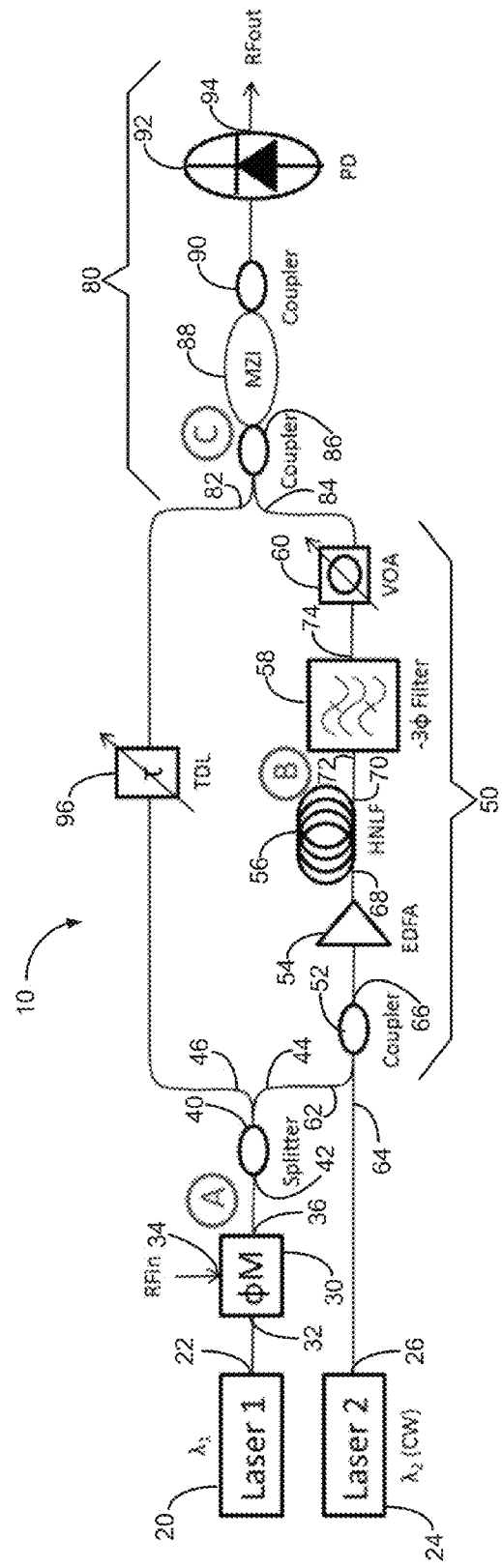
FIG. 1a is a schematic representation of an optical link, in accordance with the present disclosure.
Figure 1B:
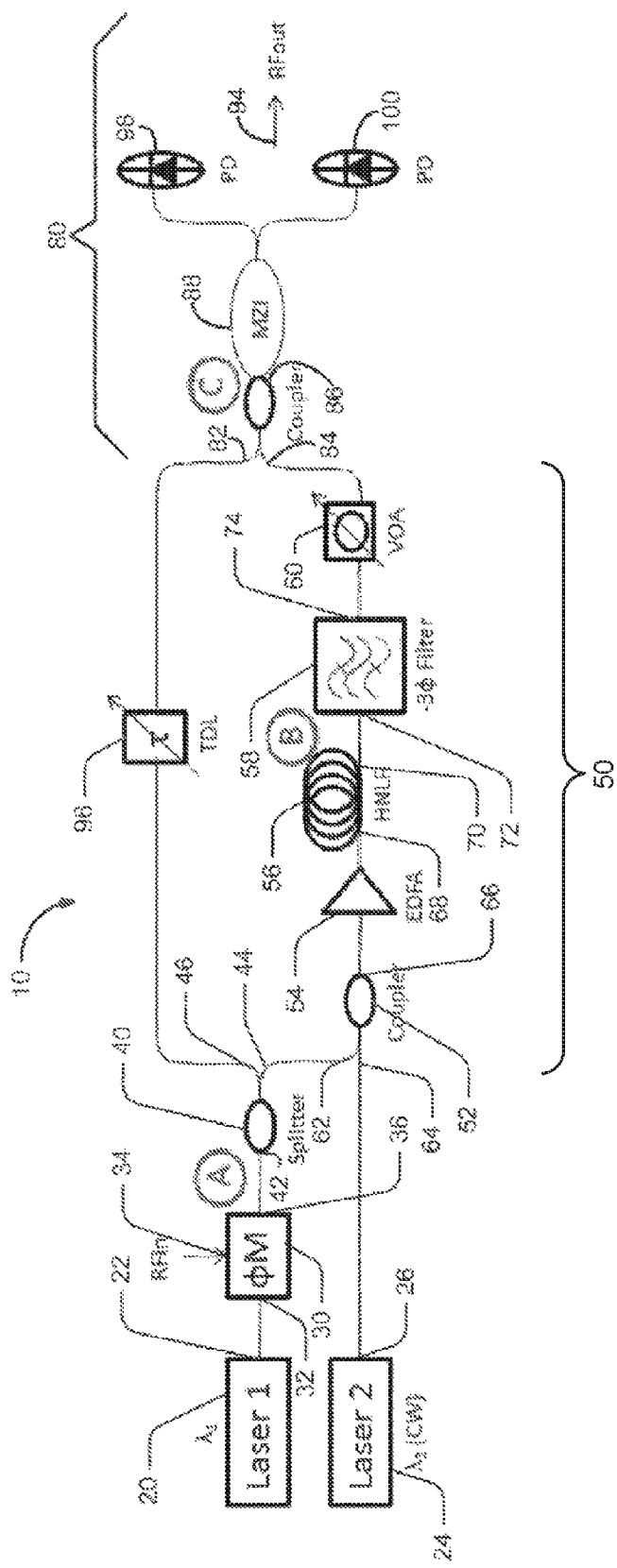
FIG. 1b is a schematic representation of an optical link, with a balanced detection system, in accordance with the present disclosure.
Figure 1C:
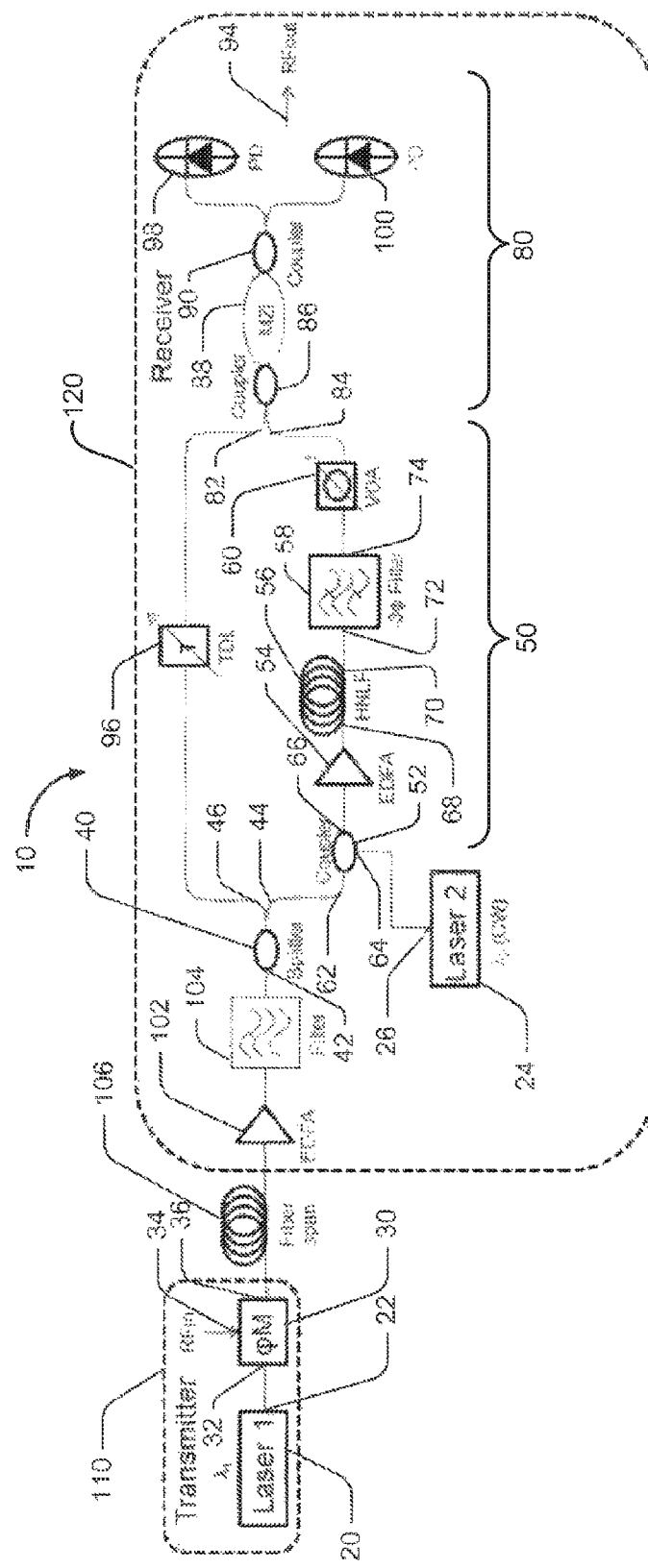
FIG. 1c is a schematic representation of an optical link, in accordance with the present disclosure.
Figure 2A:
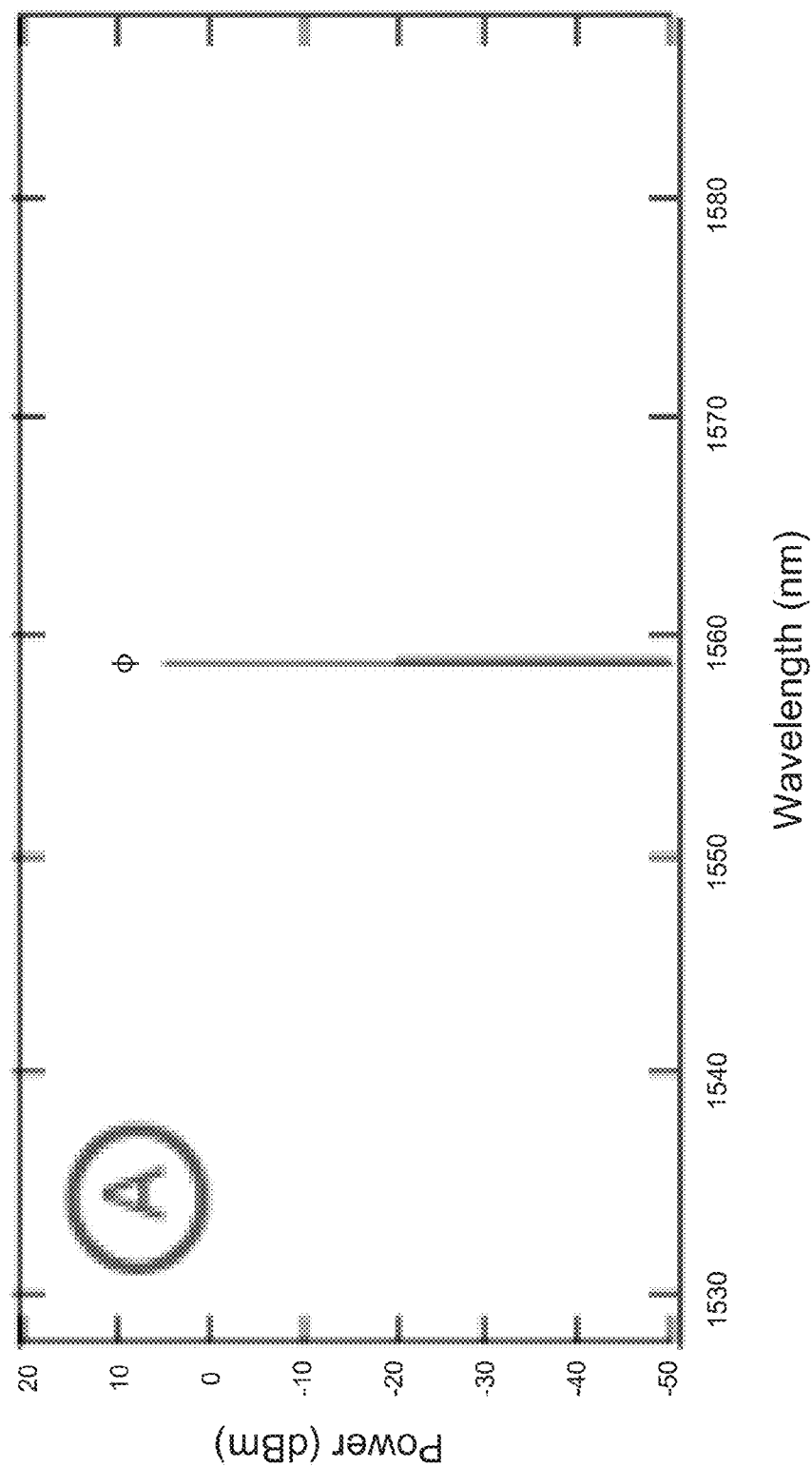
FIG. 2a shows the optical spectra at the points denoted by the letter A in the schematic of FIGS. 1a and 1b.
Figure 2B:
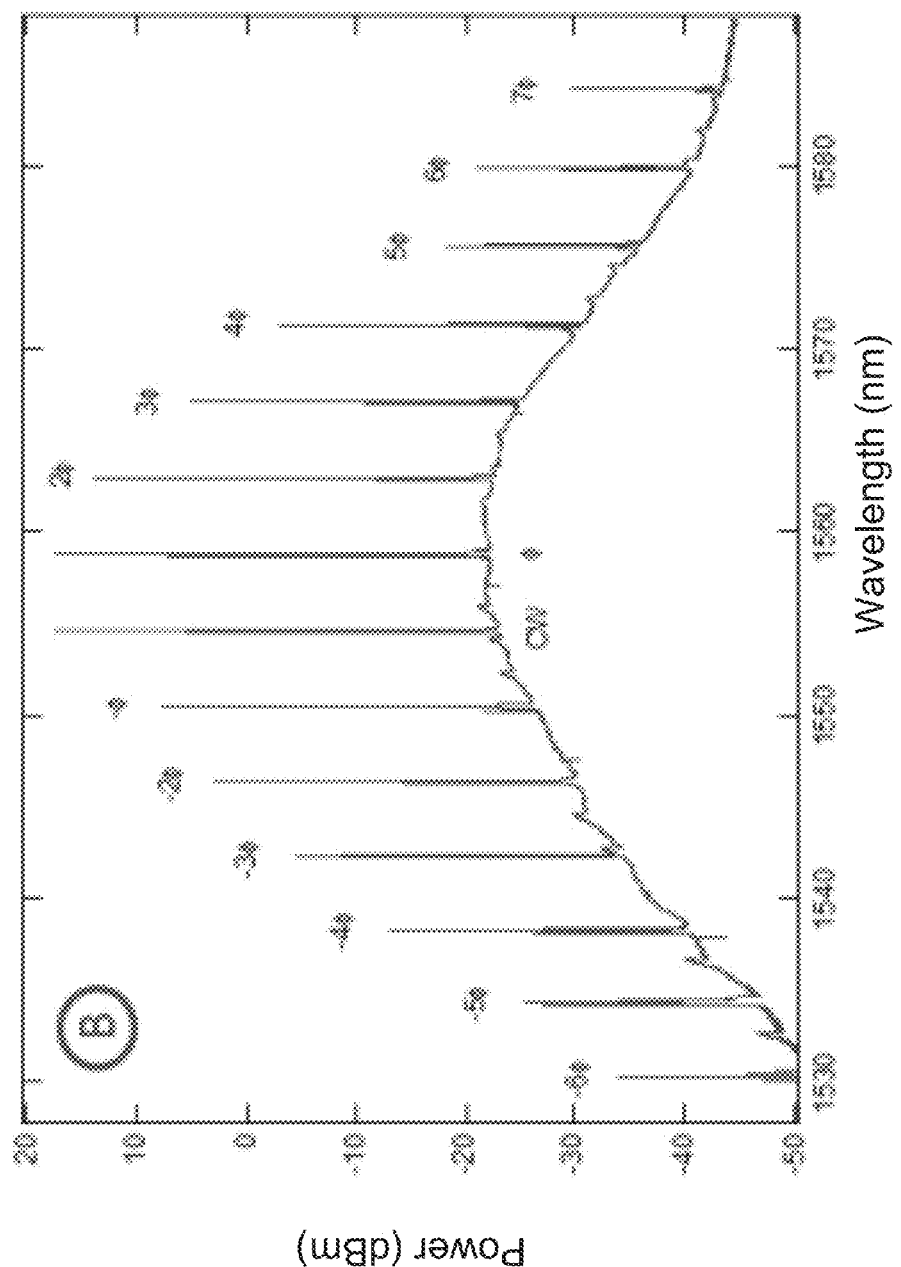
FIG. 2b shows the optical spectra at the points denoted by the letter B in the schematic of FIGS. 1a and 1b.
Figure 2C:
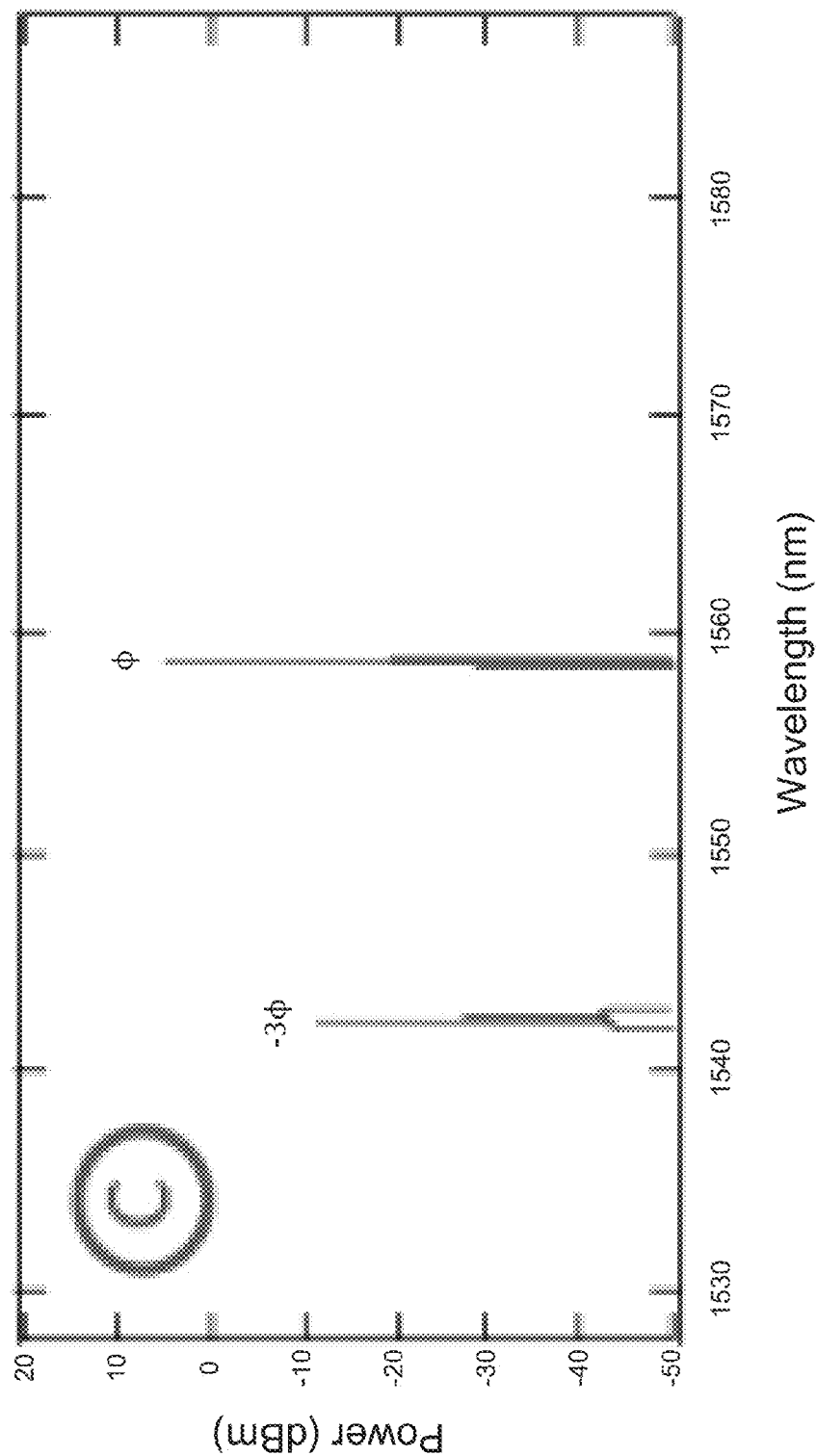
FIG. 2c shows the optical spectra at the points denoted by the letter C in the schematic of FIGS. 1a and 1b.

Referring to FIGS. 1a, 1b, and 1c, this disclosure provides an optical link 10. FIG. 2a shows a representative spectrum of the light at the points denoted by the letter A in FIGS. 1a and 1b, FIG. 2b shows a representative spectrum of the light at the points denoted by the letter B in FIGS. 1a and 1b, and FIG. 2c shows a representative spectrum of the light at the points denoted by the letter C in FIGS. 1a and 1b.

Figure 3:
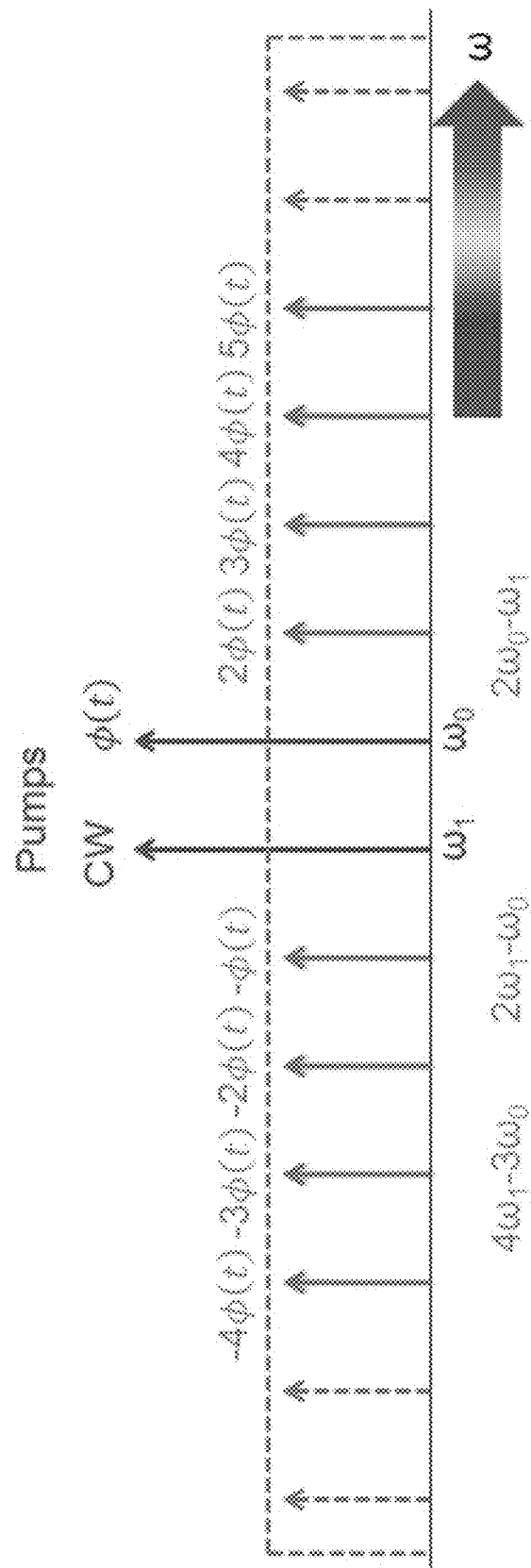
FIG. 3 is a schematic representation of a four-wave mixing process between a signal and a CW pump laser. The process produces idlers with integer multiples of the phase modulation of the original signal at frequencies which are integer multiples of $\Delta\omega = \omega_1 - \omega_0$ away from the two pumps.
Figure 4:
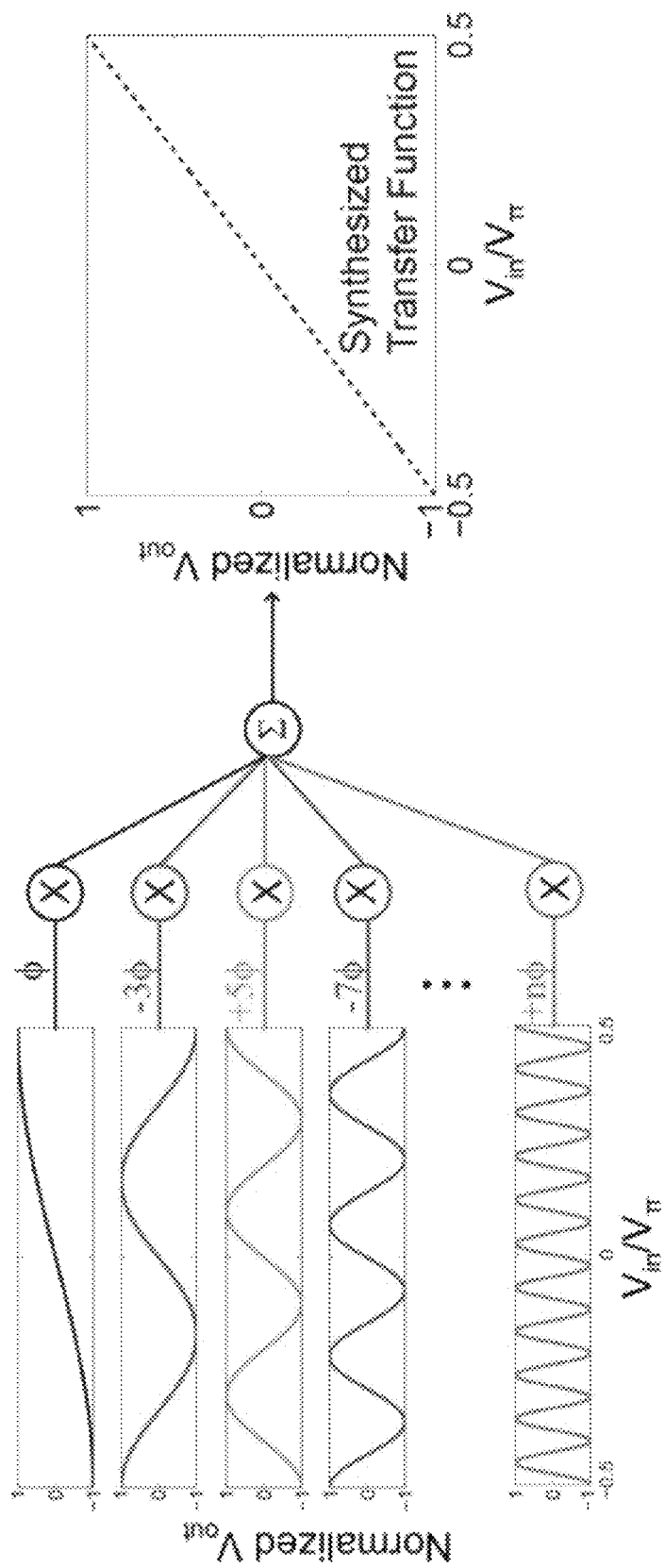
FIG. 4 illustrates how appropriately choosing, scaling, and combining lightwaves with the correct phase multiples of an original signal can lead to any transfer function being synthesized.

In certain aspects, this disclosure makes use of cascaded four-wave mixing (FWM) of a signal with an unmodulated continuous-wave laser to generate multiple lightwaves of predictable distortion. Due to the phase transfer of the FWM process, the cascaded FWM process can generate an array of lightwaves that possess integer multiples of the signal's phase modulation, as shown in FIG. 3. While the efficiency of the FWM process is polarization dependent, by implementing a polarization diversity technique it is possible to eliminate the dependency with increased receiver complexity if necessary. Due to the sinusoidal response of the interferometric detection process, each of the generated lightwaves corresponds to a Fourier component of the link's overall voltage transfer function. Therefore, as shown in FIG. 4, these lightwaves can be scaled and combined with the original signal to linearize the overall transfer function of the link. Beyond linearization, these Fourier components can also be scaled and combined to yield any custom-made transfer function through a Fourier synthesis approach. Such arbitrary transfer functions could have many signal processing applications that could potentially eliminate the need for electronic components before or after the link. For example, by introducing the inverse nonlinearity of a microwave component after the link on top of a linear transfer function, the link could be made to act as a predistorter that can enhance the performance of the overall system.

In certain aspects, this disclosure includes distortion elimination in a ΦMID link. Distortion can enter the link through the sinusoidal transfer function of the interferometric receiver. When biased at quadrature, the response can be calculated by performing a Taylor expansion of a sine function about its inflection point (see, eqns. 1-3, below).

Due to its sinusoidal response to phase, the transfer function of a phase-modulation receiver based on an interferometer or mixing with a local oscillator ("LO") is inherently nonlinear, which limits the dynamic range of the link by generating harmonics and intermodulation products. By tuning the interferometer or LO such that the second harmonic is eliminated, quadrature bias is ensured. In turn only odd-order distortions remain and minimal link loss is achieved due to the maximal derivative at this point. By performing a Taylor expansion of a sine function at 0 (Eqn. 1), it may be verified that the first distortion product that enters into consideration is of third-order.

$$\sin(\phi(t)) = \phi(t) - \frac{\phi(t)^3}{3!} + \ldots \quad (1)$$

$$\sin(3\phi(t)) = 3\phi(t) - \frac{(3\phi(t))^3}{3!} + \ldots \quad (2)$$

$$\sin(\phi(t)) - \frac{\sin(3\phi(t))}{27} = \frac{8}{9}\phi(t) - O(\phi(t)^5) + \ldots \quad (3)$$

However, if access can be gained to a lightwave that possesses three-times the phase shift of the original signal, then by subtracting an appropriately scaled version of this lightwave from the original signal, it is possible to eliminate the third-order distortion completely, thus leaving the fifth-order distortion as the first distortion term encountered (see Eqns. 1-3). This approach can be extended to eliminate all odd-order distortions. Eliminating the nth odd-order distortion simply requires the addition of one more lightwave with n-times the phase shift of the original signal. See below for the calculations supporting this extension.

Lightwaves can be generated with integer multiples of the phase-shift using an optical comb generator based on cascaded four-wave mixing ("FWM") interaction between two seed laser sources. The FWM interaction produces equally spaced comb lines on either side of the seed lasers. The phase of the generated lines is strictly determined by the phase of the seed lasers. By tapping the phase-modulated signal to serve as one of the two seed lasers, we obtain integer multiples of the phase modulation on the various comb lines (see FIG. 2b). The line with the desired phase response ($-3\phi$ in this case) is then isolated with a Wavelength Division Multiplexing (WDM) filter, and the isolated line is attenuated and combined with the original signal. Finally the two lightwaves are interferometrically detected using an asymmetric Mach-Zehnder interferometer (see FIGS. 1a, 1b, and 1c).

Figure 5:
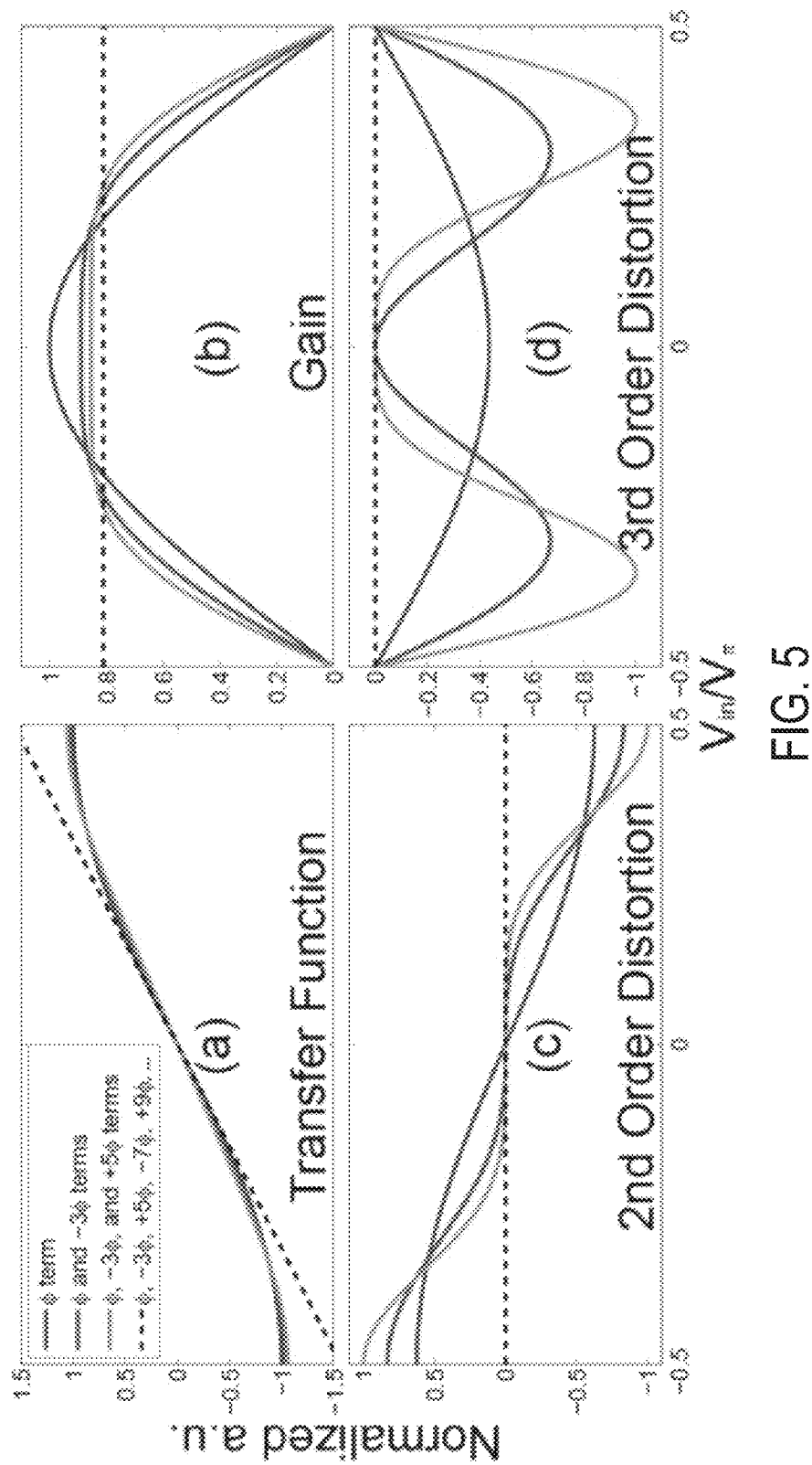
FIG. 5 shows (a) the normalized transfer function with various fourier terms (solid lines) and the ideal (dotted); (b) 1st derivative of transfer function or normalized link gain; (c) 2nd derivative or second-order distortion; and (d) 3rd derivative or third-oder distortion.

Returning to the Taylor series expansion shown in Eqs. 1-3, in addition to the desired linear term, the expansion also exhibits higher odd-order terms. This leads to large third-order distortion as shown in FIG. 5 (blue curve). By scaling and combining a lightwave of triple the phase-modulation of the original signal, the third-order distortion can be eliminated entirely, while suffering only a slight reduction in link gain (see Eqs. (2)-(3) and the red curve in FIG. 5) and leaving the fifth-order distortion as the primary limit. Adding additional lightwaves and following a similar process, it is possible to further eliminate higher-order distortion products, which also increases the quadrature bias tolerance of the interferometer (see blue curve in FIG. 5). The scale coefficients of the added lightwaves are readily found using a matrix inversion as detailed in the equations below. Furthermore, in the limit as the number of terms m→∞, the scale coefficients asymptotically approach those of the Fourier expansion of a triangle wave.

Figure 6:
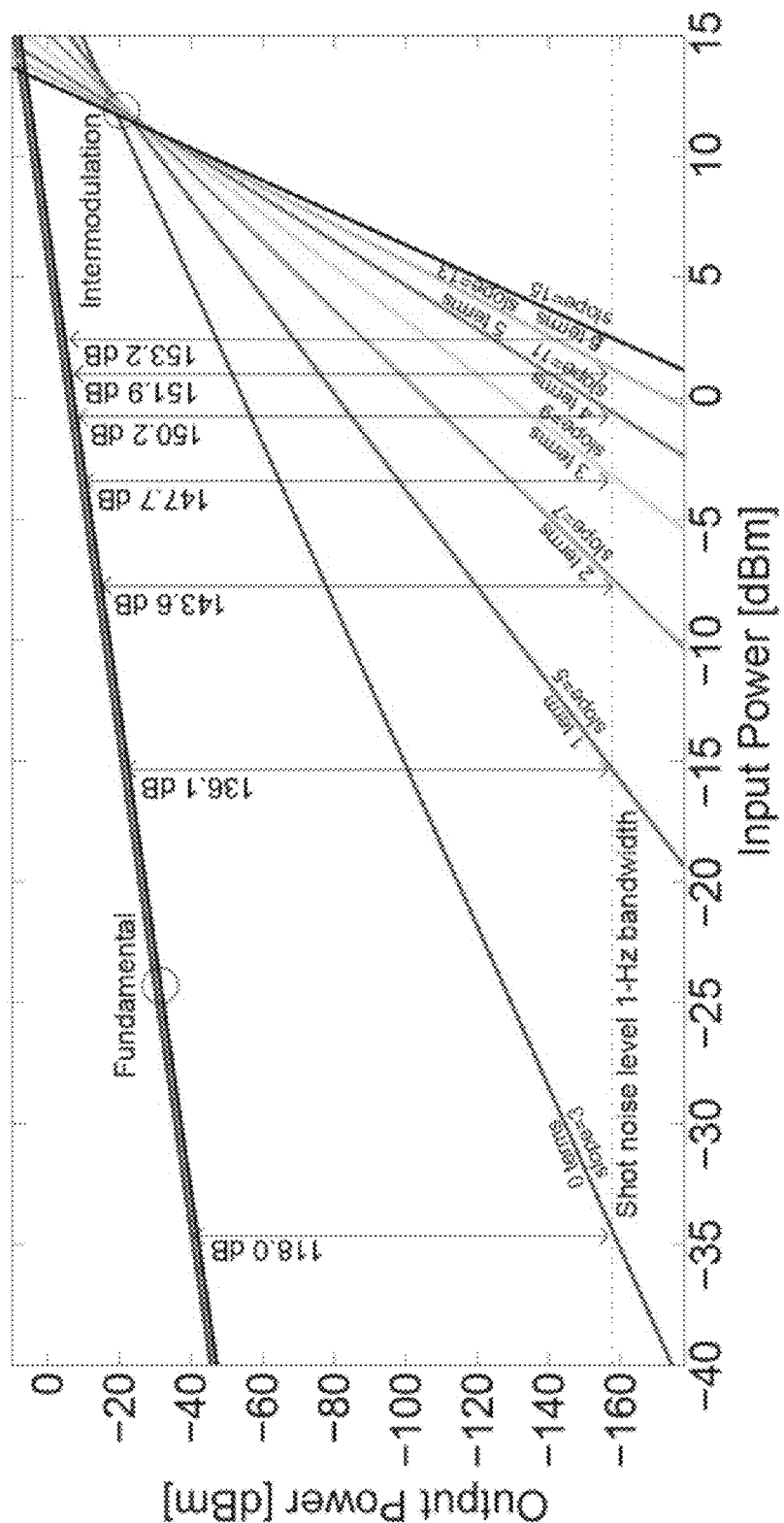
FIG. 6 shows the theoretical SFDR performance calculated for a ΦMID in accordance with the present disclosure.
Figure 7:
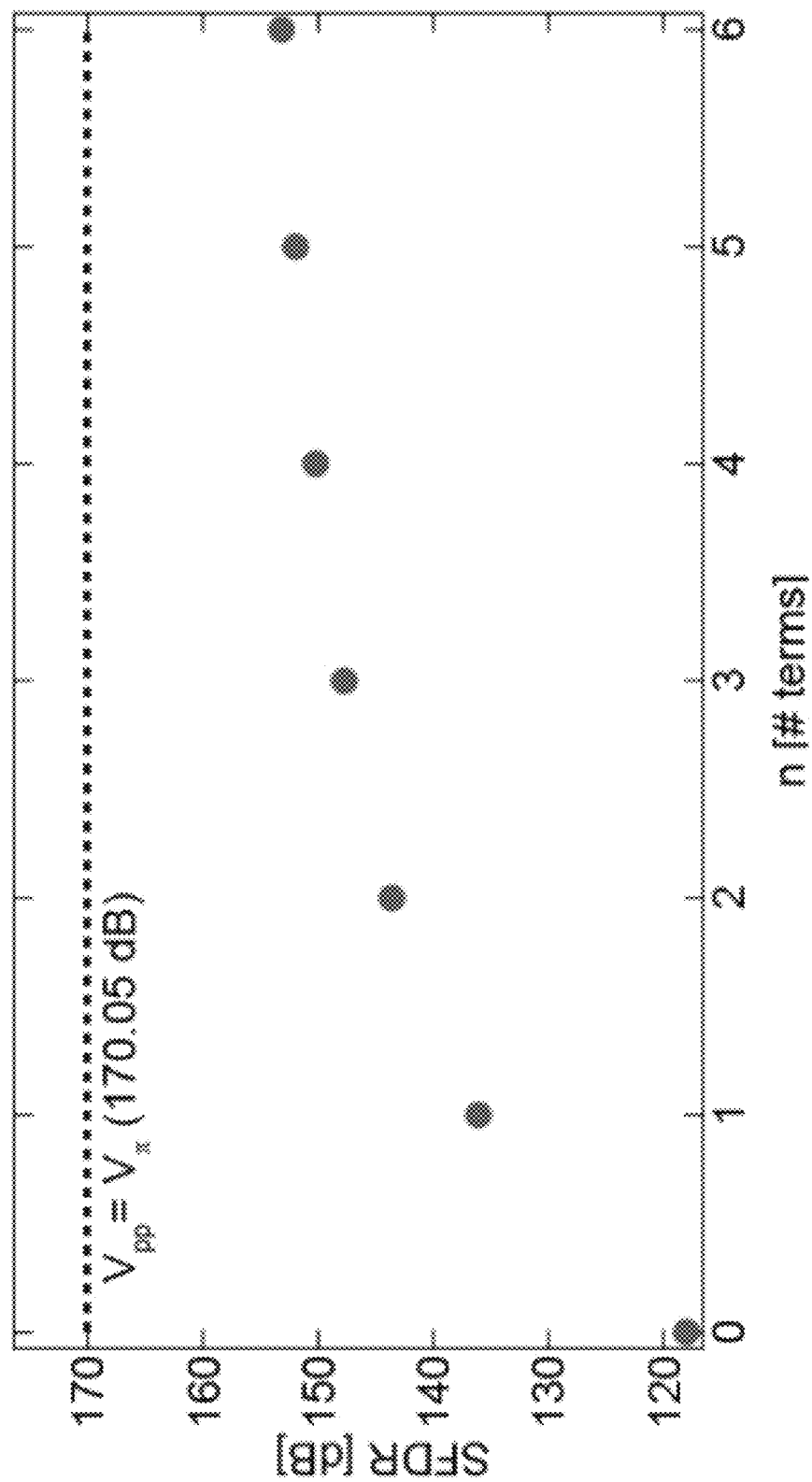
FIG. 7 is a plot of the calculated SFDR as an increasing number of linearization terms are added. The dashed line represented SFDR for a perfectly linear link when the maximum peak to peak voltage equals the modulator $V_\pi$ for reference.
Figure 8:
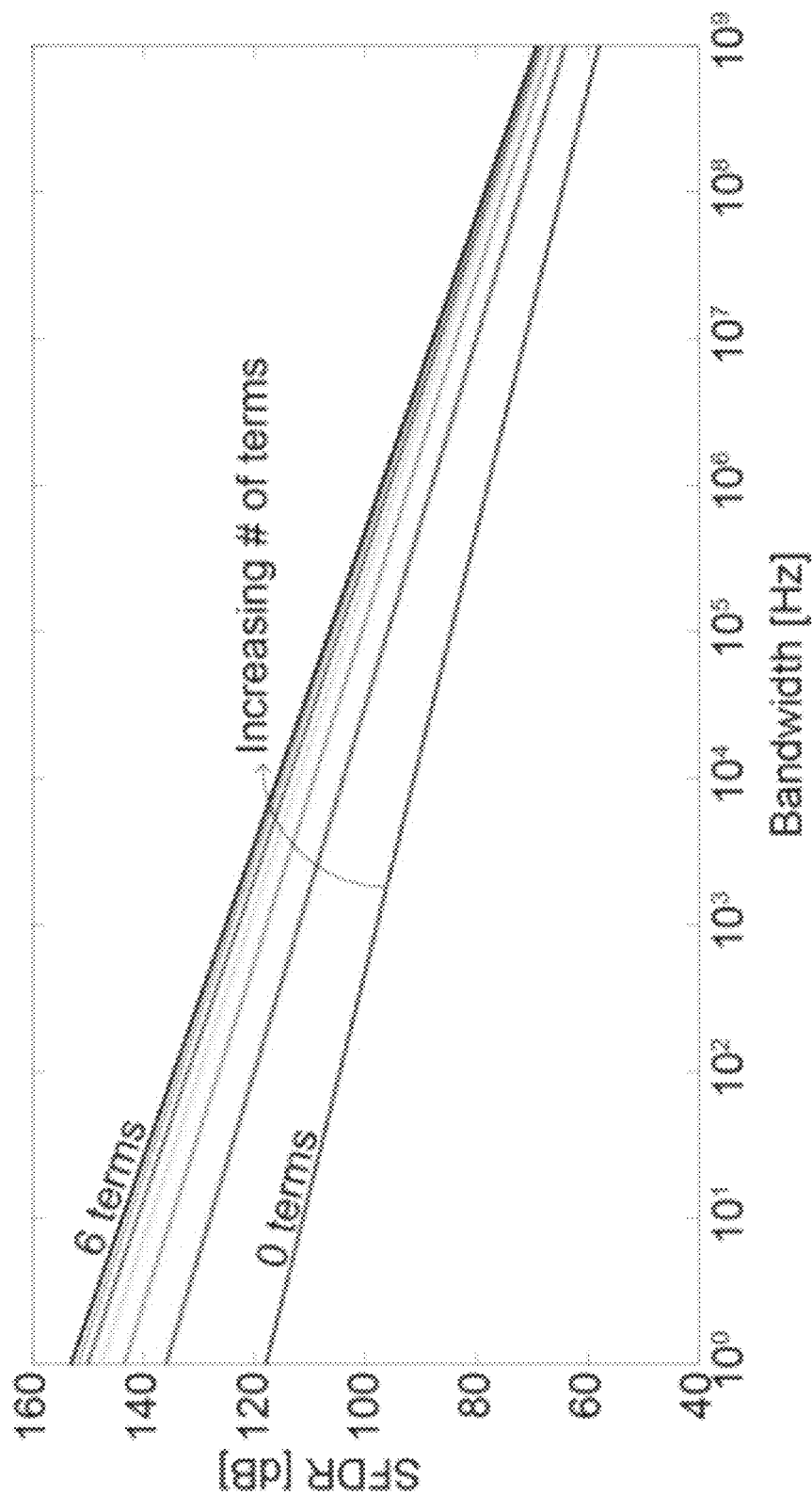
FIG. 8 is a plot of the calculated SFDR versus signal bandwidth for varying numbers of linearization terms.

To investigate the impact of the linearization of the optic links described herein on the SFDR of the φMID link, a calculation was performed of the SFDR resulting from the fundamental tone and the intermodulation product generated by a two-tone test using the coefficients found by the methods described herein. For comparison with experimental results, a modulator $V_\pi$ of 5.9 V and a photocurrent of 5 mA for each detector in balanced configuration were used. FIG. 6 shows the received fundamental and intermodulation power as a function of microwave power input to the link. In this case, for SFDR calculation, a shot noise limited link was assumed. For the same link parameters, FIG. 7 shows the SFDR at 1-Hz bandwidth as a function of the number of linearization terms. FIG. 8 shows the link SFDR dependence on signal bandwith in a plot of SFDR versus bandwidth across a range of number of linearization terms.

Notably, the approach described can be extended to reducing distortion effects of higher orders. For example, including both the $-3\phi$ and $+5\phi$ terms will allow for cancellation of both the third and fifth order distortions in the receiver. In fact, this technique may be extended infinitely to eliminate all harmonics, resulting in a triangle wave transfer function with the scaling factors converging to the coefficients of the Fourier expansion of the triangle function. Again, see below for the calculations supporting this extension.

Referring to FIGS. 1a, 1b, and 1c, this disclosure provides an optical link 10. Referring to FIG. 1c, the optical link 10 can include a transmitter 110 and a receiver 120. Optical signals that are emitted by the transmitter 110 traverse some distance, in some instances along an optical waveguide 106, shown in FIG. 1c as a fiber span 106, and the signals are then received at the receiver 120. The optical link 10 may include one or more of the following: a first light source 20; a second light source 24; a phase encoder 30; a splitter 40; a distortion compensation element 50; and a detector 80.

The transmitter 110 can include the first light source 20 and the phase encoder 30. The first light source 20 may include a first light source output 22. The second light source 24 may include a second light source output 26.

This disclosure also provides a receiver 120 as described herein. The receiver 120 can include the second light source 24, the splitter 40, the distortion compensation element 50 and the detector 80.

The first light source 20 can be a pulsed light source. Examples of suitable first light sources 20 include, but are not limited to, a diode laser, a fiber laser, a solid-state laser, a gas laser, an optical parametric oscillator, a Brillouin oscillator, a Raman oscillator, and the like.

The second light source 24 can be a continuous wave light source. Examples of suitable second light sources 24 include, but are not limited to, a diode laser, a fiber laser, a solid-state laser, a gas laser, an optical parametric oscillator, a Brillouin oscillator, a Raman oscillator, and the like.

The phase encoder 30 may include one or more of a phase encoder input 32, a signal input 34, and a phase encoder output 36. The phase encoder input 32 may be in optical communication with the first light source output 22. The signal input 34 may be adapted to receive a radio-frequency signal. The phase encoder 30 may be adapted to produce a phase-encoded optical signal from optical radiation produced by the first light source 20 and a radio-frequency input received at the signal input 34.

The splitter 40 may include one or more of a splitter input 42, a first splitter output 44, and a second splitter output 46.

The splitter input 42 may be in optical communication with the phase encoder output 36. The splitter 40 may be adapted to receive a splitter optical signal at the splitter input 42 and provide a first portion of the splitter optical signal at the first splitter output 44 and a second portion of the splitter optical signal at the second splitter output 46. Examples of suitable splitters include, but are not limited to, dichroic beamsplitters, prism beamsplitters, fused fiber coupler, an evanescent coupler, a multi-mode interferometer, and the like. A person having ordinary skill in the art will appreciate that a variety of splitters can be utilized to achieve the function described herein, and the particular type of splitter deployed is not intended to be limiting to this disclosure. A person having ordinary skill in the art will also appreciate that the properties of the particular splitter chosen can vary based on the properties of the splitter optical signal, such as the wavelength, pulse duration, etc.

The phase-modulated optical link 10 may further include a tunable delay line 96. The tunable delay line may be positioned between and in optical communication with the second splitter output 46 and the first detector input 82. The tunable delay line 96 may be adapted to selectively adjust the optical path length between the second splitter output 46 and the first detector input 82.

The distortion compensation element 50 may include one or more of the following: a first coupler 52; an amplifier 54; an optical comb generator 56; a peak selector 58; and a variable optical attenuator 60.

The first coupler 52 may include one or more of a primary first coupler input 62, a secondary first coupler input 64, and a first coupler output 66. The primary first coupler input 62 may be in optical communication with the first splitter output 46. The secondary first coupler input 64 may be in optical communication with the second light source output 26.

The amplifier 54 may include a fiber amplifier. In certain aspects, the amplifier 54 can be a doped fiber amplifier. In certain aspects, the amplifier 54 can be an Erbium doped fiber amplifier (EDFA). The amplifier in 54 can be a semiconductor optical amplifier. The amplifier in 54 can be a Raman optical amplifier. The amplifier in 54 can be a Brillouin optical amplifier. The amplifier in 54 can be a parametric optical amplifier. The amplifier 54 may be positioned between and in optical communication with the first coupler output 66 and the optical comb generator input 68.

Referring to FIG. 1c, the optical link 10 can also include an additional amplifier 102 and filter 104 that are upstream of the splitter 40.

The optical comb generator 56 may include one or more of an optical comb generator input 68 and an optical comb generator output 70. The optical comb generator input 68 may be in optical communication with the first coupler output 66. The optical comb generator 56 may include a highly nonlinear optical fiber (HNLF). In certain aspects, the optical comb generator 56 can comprise two cascaded spools of HNLF. In certain arrangements, the first of the two cascaded spools of HNLF is 88 m long and staircase-tensioned in ten steps from low to high tension to suppress Brillouin scattering, and the second HNLF is 100 m long and has uniform low tension, as described in E. Myslivets, B. P. Kuo, N. Alic, and S. Radic, "Generation of wideband frequency combs by continuous-wave seeding of multistage mixers with synthesized dispersion," Opt. Express 20(3), 3331-3344 (2012), which is incorporated herein in its entirety by reference. The optical comb generator 56 may be adapted to perform four-wave mixing.

The peak selector 58 may include one or more of a peak selector input 72 and a peak selector output 74. The peak selector input 72 may be in optical communication with the optical comb generator output 70. The peak selector 58 may include an optical bandpass filter. It should be appreciated that the properties of the peak selector 58 may vary based on the optical properties of the underlying optical signal for the optical comb and the particular comb line that a user chooses to isolate from the optical comb.

The variable optical attenuator 60 may be positioned between and in optical communication with the peak selector output 74 and the second detector input 84. The variable optical attenuator can be a mechanical attenuator, a polarization-based attenuator, a absorptive attenuator, and the like.

The detector 80 may include one or more of a first detector input 82, a second detector input 84, a second coupler 86, an interferometer 88, a third coupler, 90, a photodiode 92, and a signal output 94. The first detector input 82 may be a primary second coupler input 82 of the second coupler 86 and the second detector input 84 may be a secondary second coupler input 84 of the second coupler 86. In certain aspects, the interferometer 88 may be a Mach-Zehnder interferometer. In certain aspects, the signal output 94 may be adapted to produce a radio-frequency signal.

In another arrangement, referring to FIG. 1b, the detector 80 may comprise a balanced detector arrangement. In this arrangement, the detector 80 may include one or more of a first detector input 82, a second detector input 84, a second coupler 86, an interferometer 88, a first photodiode 98, a second photodiode 100, and a signal output 94.

The first photodiode 98 and the second photodiode 100 can be part of a single instrument. For example, the first photodiode 98 and the second photodiode 100 can be part of a Discovery Semiconductors DSC740 balanced photodetector with 0.62 A/W responsivity and 26 GHz bandwidth (available commercially from Discovery Semiconductors, Inc. Ewing Township, N.J.). A person having ordinary skill in the art will appreciate that there are a multitude of laboratory-constructed and commercially-available alternatives, so long as the first photodiode 98 and the second photodiode 100 are operable to provide the signal output 94 as described herein.

In certain aspects, a phase-modulated optical link 10 may include: a phase encoder 30 that receives a signal input and provides a phase-encoded optical signal; a phase-modulation detector 80; or a distortion compensation element 50 comprising an optical comb generator 56 that is seeded by the phase-encoded optical signal.

This disclosure provides a method of compensating distortion in a phase-modulated optical link. The methods may include one or more of the following steps: generating an optical comb seeded by a first portion of a phase-encoded optical signal, the optical comb comprising a plurality of peaks; isolating at least one of the plurality of peaks to produce a peak-selected optical comb; and combining the peak-selected optical comb with a second portion of the phase-encoded signal. The methods may also include any of the features described elsewhere here with respect to the optical link 10.

The following shows how to derive the scaling factors for the Fourier coefficients of a linear transfer function, assuming quadrature bias and thus no even order distortion. Starting with two lightwaves $\phi(t)$ and $3\phi(t)$ and using the first two terms of the Taylor expansion, one can readily solve for the scaling factor required for the second lightwave to eliminate the third order distortion and leave only the linear term:

$$\sin\phi(t) = \phi(t) - \frac{\phi(t)^3}{3!} + \ldots \quad (4)$$

$$a_1 \sin 3\phi(t) = a_1 3\phi(t) - \frac{a_1(3\phi(t))^3}{3!} + \ldots \quad (5)$$

$$\sin\phi(t) + a_1\sin 3\phi(t) = (1 + 3a_1)\phi(t) \quad (6)$$

$$[3^3][a_1] = [-1] \quad (7)$$

$$[a_1] = \left[-\frac{1}{27}\right]. \quad (8)$$

If another lightwave is added, $5\phi(t)$ and the first three terms of the Taylor series are found, then both the third and fifth order distortions can be eliminated. To do this, the scaling factors for both the $3\phi(t)$ lightwave (because the scaling factor changes as the number of lightwaves is changed) and the $5\phi(t)$ lightwave must be found. This can be achieved by performing the following matrix inversion:

$$\sin\phi(t) = \phi(t) - \frac{\phi(t)^3}{3!} + \frac{\phi(t)^5}{5!} - \ldots \quad (9)$$

$$+a_1\sin 3\phi(t) = a_1 3\phi(t) - \frac{a_1(3\phi(t))^3}{3!} + \frac{a_1(3\phi(t))^5}{5!} - \ldots \quad (10)$$

$$+a_2\sin 5\phi(t) = a_2 5\phi(t) - \frac{a_2(5\phi(t))^3}{3!} + \frac{a_2(5\phi(t))^5}{5!} - \ldots \quad (11)$$

$$\sin\phi(t) + a_1\sin 3\phi(t) + a_2\sin 5\phi(t) = (1 + 3a_1 + 5a_2)\phi(t) \quad (12)$$

$$\begin{bmatrix} 3^3 & 5^3 \\ 3^5 & 5^5 \end{bmatrix} \begin{bmatrix} a_1 \\ a_2 \end{bmatrix} = \begin{bmatrix} -1 \\ -1 \end{bmatrix} \quad (13)$$

$$\begin{bmatrix} a_1 \\ a_2 \end{bmatrix} = \begin{bmatrix} -\frac{1}{18} \\ \frac{1}{250} \end{bmatrix}. \quad (14)$$

In general, the first (2m+1) distortions can be removed by adding m lightwaves, as follows:

$$\sin\phi(t) = \phi(t) - \frac{\phi(t)^3}{3!} + \frac{\phi(t)^5}{5!} + \ldots + \frac{(-1)^m \phi(t)^{2m+1}}{(2m+1)!} + \ldots \quad (15)$$

$$+a_1\sin 3\phi(t) = \quad (16)$$
$$a_1 3\phi(t) - \frac{a_1(3\phi(t))^3}{3!} + \frac{a_1(3\phi(t))^5}{5!} + \ldots + \frac{a_1(-1)^m(3\phi(t))^{2m+1}}{(2m+1)!} + \ldots$$

$$+a_2\sin 5\phi(t) = \quad (17)$$
$$a_2 5\phi(t) - \frac{a_2(5\phi(t))^3}{3!} + \frac{a_2(5\phi(t))^5}{5!} + \ldots + \frac{a_2(-1)^m(5\phi(t))^{2m+1}}{(2m+1)!} + \ldots$$

$$+a_m\sin(2m+1)\phi(t) = a_m(2m+1)\phi(t) - \frac{a_m((2m+1)\phi(t))^3}{3!} + \quad (18)$$
$$\frac{a_m((2m+1)\phi(t))^5}{5!} + \ldots + \frac{a_m(-1)^m((2m+1)\phi(t))^{2m+1}}{(2m+1)!} + \ldots$$

$$\sin\phi(t) + a_1\sin 3\phi(t) + a_2\sin 5\phi(t) + \ldots + a_m\sin(2m+1)\phi(t) = \quad (19)$$
$$(1 + 3a_1 + 5a_2 + \ldots + (2m+1)a_m)\phi(t)$$

$$\begin{bmatrix} 3^3 & \ldots & (2m+1)^3 \\ \vdots & \ddots & \vdots \\ 3^{2m+1} & \ldots & (2m+1)^{2m+1} \end{bmatrix} \begin{bmatrix} a_1 \\ \vdots \\ a_m \end{bmatrix} = \begin{bmatrix} -1 \\ \vdots \\ -1 \end{bmatrix} \quad (20)$$

$$\begin{bmatrix} a_1 \\ \vdots \\ a_m \end{bmatrix} = \begin{bmatrix} 3^3 & \ldots & (2m+1)^3 \\ \vdots & \ddots & \vdots \\ 3^{2m+1} & \ldots & (2m+1)^{2m+1} \end{bmatrix}^{-1} \begin{bmatrix} -1 \\ \vdots \\ -1 \end{bmatrix}. \quad (21)$$

Example 1. Comparison of Traditional ΦMID Link to Linearized ΦMID Link

Figure 9:
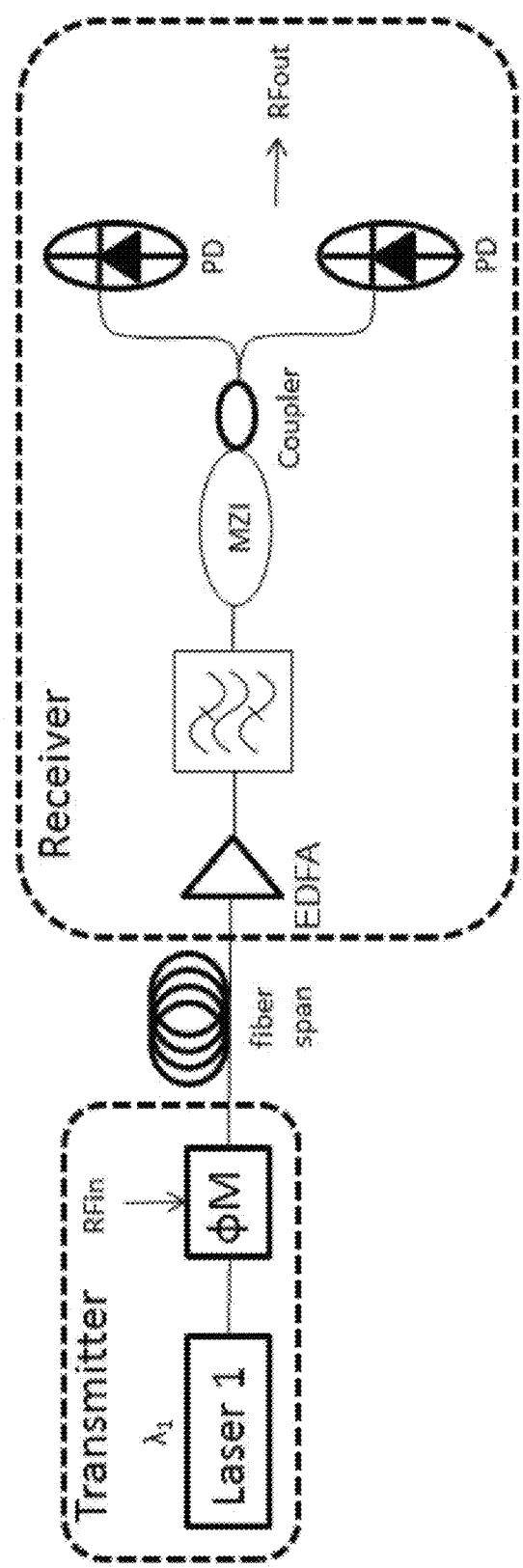
FIG. 9 is a schematic representation of a conventional phase-modulated analog optical link.

A linearized optical link in the form of an apparatus as shown in FIG. 1a and a conventional optical link in the form of an apparatus as shown in FIG. 9 were constructed.

Figure 10:
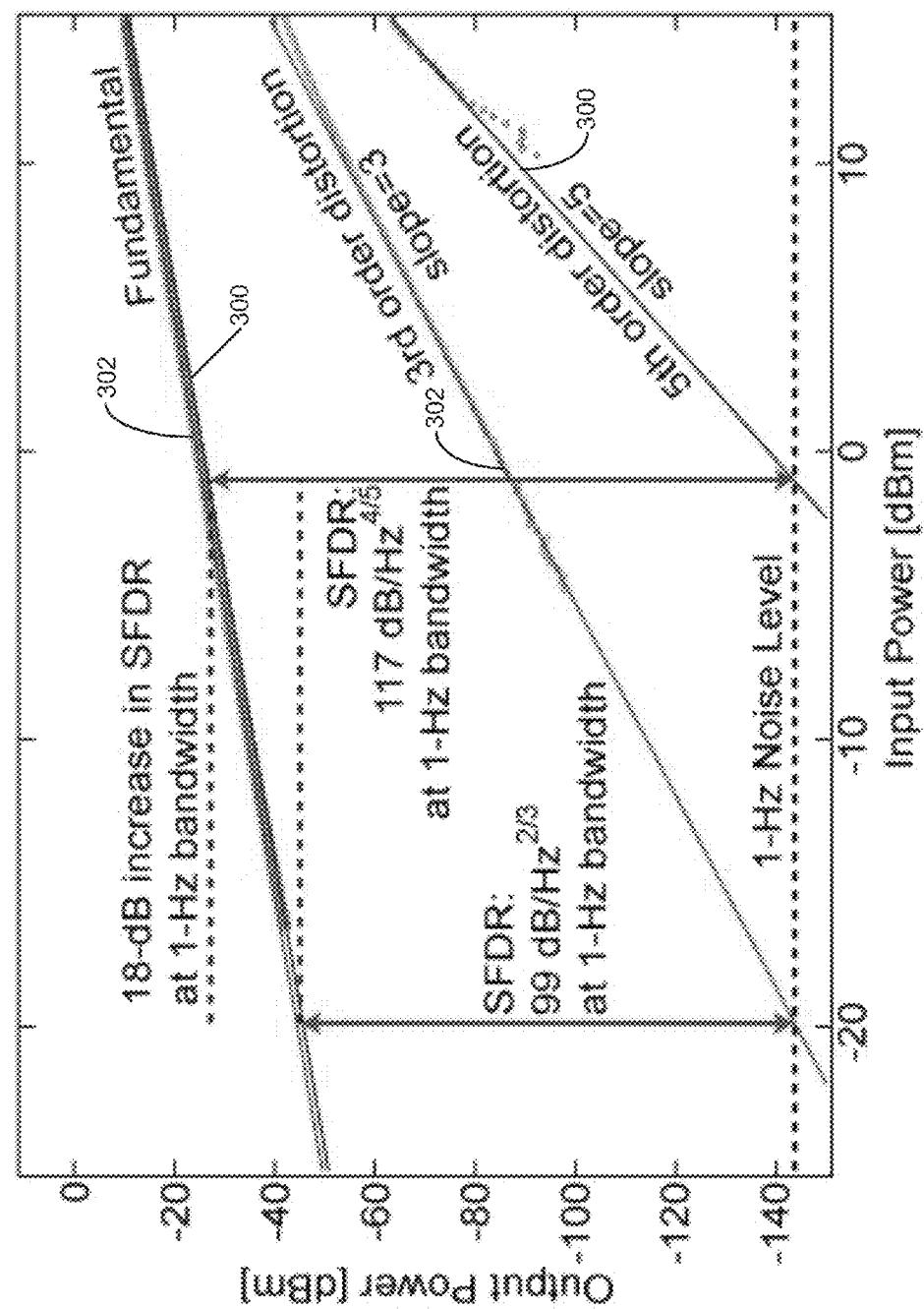
FIG. 10 is an SFDR comparison between a signal with (300) and without (302) the all-optical distortion compensation as described in Example 1.

To analyze the distortion of the link, by way of example, a fundamental signal (5-GHz tone) and third-harmonic (15-GHz) were experimentally detected as a function of input microwave power. The results of this characterization with the all-optical distortion compensation 300 and without the all-optical distortion compensation 302 are shown in FIG. 10. As described, the third-order distortion of the receiver is fully canceled, as evidenced by the complete elimination of the third-harmonic power. The fifth-order distortion now becomes the dominant nonlinearity as evidenced by the 5th-order dependence of the resulting third-harmonic power on input power. Assuming the worst case noise level, this distortion compensation results in an SFDR improvement of at least 18 dB.

Example 2. Comparison of Traditional ΦMID Link to Linearized ΦMID Link

A linearized optical link in the form of an apparatus as shown in FIG. 1c and a conventional optical link in the form of an apparatus as shown in FIG. 9 were constructed.

As shown in FIG. 9, the conventional optical link included a 20-mW laser operated at 1558.98 nm and a 20-GHz electrooptic phase modulator in the transmitter. In the receiver, an EDFA that received about 10 mW and provided output of about 85 mW was positioned to receive the optical signal emitted from the transmitter, after the signal passed through a span of optical fiber. A bandpass filter aligned with the laser wavelength removed the out of band amplified spontaneous emission noise from the signal. Finally, the phase modulated signal was detected using an asymmetric Mach-Zehnder interferometer (a-MZI) and a Discovery Semiconductors DSC740 balanced photodetector with 0.62 A/W responsivity and 26 GHz bandwidth (available commercially from Discovery Semiconductors, Inc. Ewing Township, N.J.). The first and second light sources are both New Focus™ 6700 series External Cavity Tunable Diode lasers with <200 kHz linewidth (available commercially from Newport Corporation, Irvine Calif.).

Using the linearized optical link shown in FIG. 1c, components that were present in the conventional optical link shown in FIG. 9 were the same as described above, and additional components were added. After amplifying the phase-modulated signal, the splitter separated about 10% of the phase-modulated signal, which was then combined with another continuous-wave laser operating at 1554.79 nm and 17 mW to seed the cascaded FWM comb generation process. The comb source consisted of two cascaded spools of HNLF, the first of which is 88 m long and staircase-tensioned in ten steps from low to high tension to suppress Brillouin scattering, and the second of which is 100 m long and has uniform low tension, as described in E. Myslivets, B. P. Kuo, N. Alic, and S. Radic, "Generation of wideband frequency combs by continuous-wave seeding of multistage mixers with synthesized dispersion," Opt. Express 20(3), 3331-3344 (2012), which is incorporated herein in its entirety by reference. The EDFA was operated prior to the comb generation at 2 W. After the comb generation, the −3φ(t) comb line was isolated using an optical bandpass filter at 1542.94 nm. The scaling factor was introduced by attenuating the −3φ(t) signal with a variable optical attenuator (VOA) such that the intermodulation product was minimized. The experimentally measured scale factor was about 1/24. Without wishing to be bound by any particular theory, the slight deviation from the theoretical value of 1/27 may result from compensation for additional sources of distortion in the link (e.g., the photodetector). Finally, this lightwave was combined with the original signal using a WDM filter and the a-MZI and balanced photodetector were used to receive the combined signal.

For both the linearized optical link of FIG. 1a and the conventional optical link of FIG. 9, a 100 ps path length difference was used in the a-MZI, which produced periodic dips spaced 10 GHz apart in the frequency response. The first peak near 5 GHz was chosen as the center frequency and the bandwidth was expected to be about 8 GHz. The peak gain of the link was determined primarily by the $V_\pi$ of the phase modulator and the current generated at the photodetector. For both links, the same 5.9-V $V_\pi$ phase modulator was used and the links were operated with 5 mA on each photodetector in the balanced receiver. A peak gain of −10.56 dB at 5 GHz was achieved in the linearized link and a small 1-dB reduction in the linearized link gain was observed relative to the conventional link.

The noise figure of a phase-modulated link with balanced detection is primarily impacted by thermal noise in the detector, shot noise, and laser phase noise since laser relative intensity noise (RIN) is canceled through balanced detection. The noise figure of the linearized and conventional optical link was experimentally measured to be 39 dB, providing evidence that the linearization adds negligible noise to the link. Without wishing to be bound by any particular theory, it is believed that much of the noise in the experimental setup was introduced by the use of the diode lasers, and that the noise figure is expected to be reducable to near the shot noise limited level of 22.5 dB by incorporating fiber lasers into the arrangement.

Figure 11:
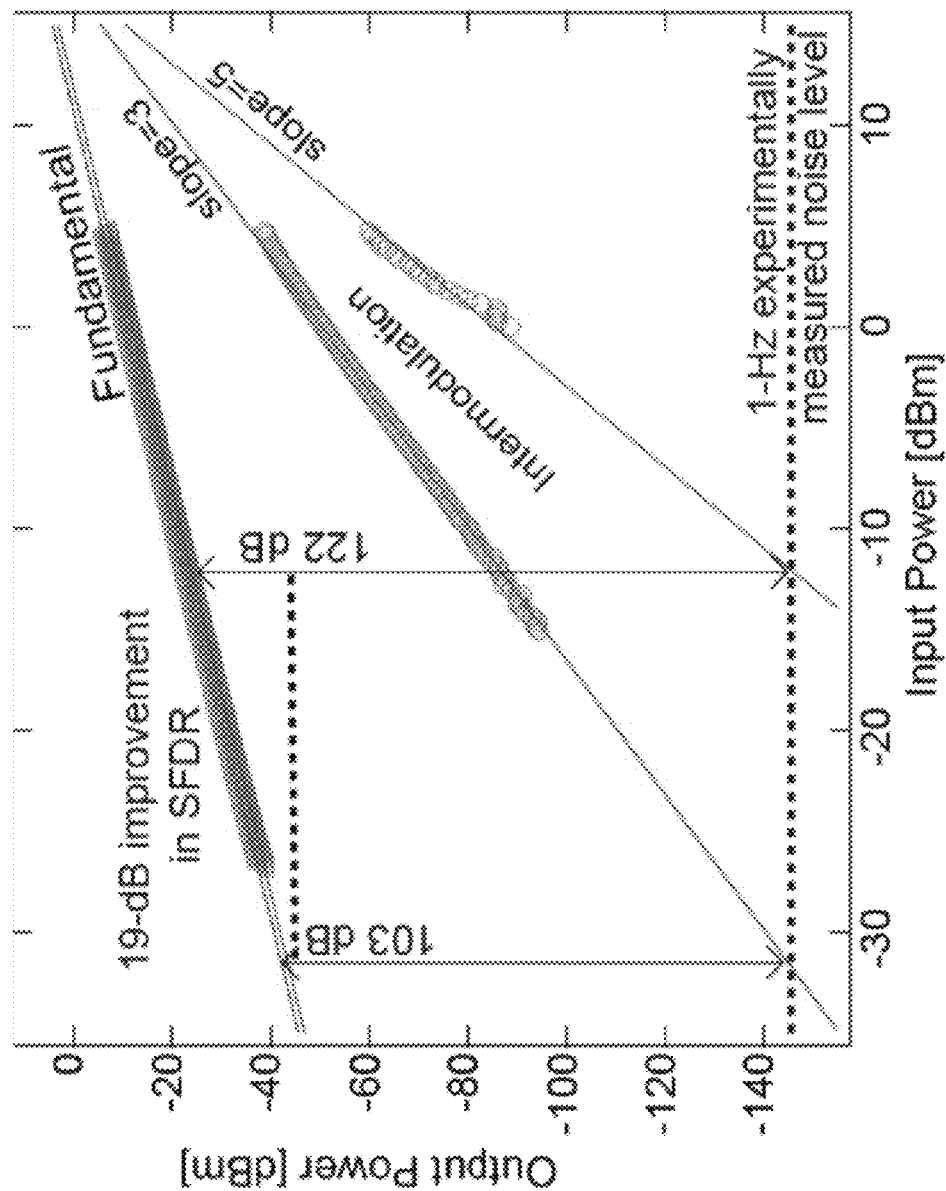
FIG. 11 is an SFDR comparison between the conventional (red) and linearized (blue) phase-modulated optical link, as described in Example 2.

The SFDR was measured using a two-tone test in which two microwave tones, one at 5.35 GHz and the other at 5.45 GHz, were combined and applied to the input of the phase modulator. For sufficiently high microwave drive powers, spurious intermodulation tones at 5.25 GHz and 5.55 GHz were produced. By sweeping the powers of the input tones, the link SFDR was determined. FIG. 11 shows the experimentally measured fundamental power and intermodulation power as a function of input power of both the conventional link and the linearized link. For the conventional link, an SFDR of 103 dB was measured. For the linearized link, an SFDR of 122 dB was measured, which shows a 19 dB improvement in SFDR for a 1 Hz noise bandwidth. Furthermore, the intermodulation power was shown to scale with the input power raised to the fifth power indicating that the impact of third-order distortion was minimized over the measured power range. Due to the change in slope of the intermodulation power from 3 to 5, the SFDR improvement over the conventional link depends on the signal bandwidth.

Figure 12:
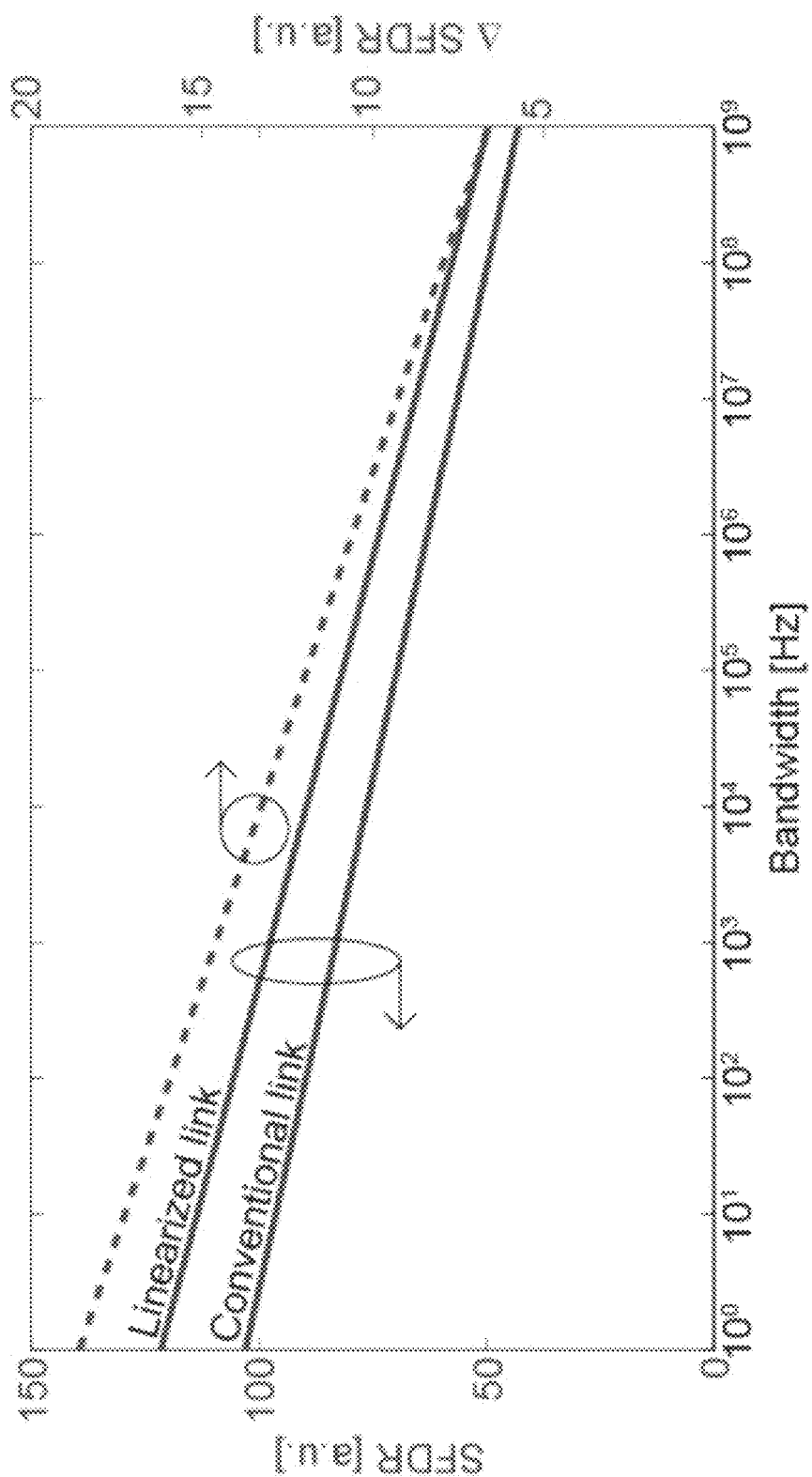
FIG. 12 is a plot of experimental SFDR versus bandwidth for the conventional and linearized link described in Example 2. The SFDR improvement is plotted as the dashed line.

FIG. 12 shows the link SFDR and SFDR improvement as a function of signal bandwidth based on the experimental characterizations.

The present invention has been described in terms of one or more preferred embodiments, and it should be appreciated that many equivalents, alternatives, variations, and modifications, aside from those expressly stated, are possible and within the scope of the invention.

The invention claimed is:

1. A phase-modulated optical link comprising:
    a first light source comprising a first light source output, the first light source including a phase-modulated light source;
    a second light source comprising a second light source output, the second light source including a continuous-wave light source;
    a phase encoder comprising a phase encoder input in optical communication with the first light source output, the phase encoder further comprising a signal input and a phase-encoded optical signal output;
    a splitter comprising a splitter input in optical communication with the phase-encoded optical signal output, the splitter further comprising a first splitter output and a second splitter output, wherein the splitter is adapted to receive a splitter optical signal at the splitter input and provide a first portion of the splitter optical signal at the first splitter output and a second portion of the splitter optical signal at the second splitter output, the splitter optical signal being based on an optical signal of the phase-modulated light source;
    a distortion compensation element comprising:
        a first coupler comprising a first coupler input in optical communication with the first splitter output and a second coupler input in optical communication with the second light source output, the first coupler further comprising a first coupler output,
        an optical comb generator comprising an optical comb generator input in optical communication with the first coupler output, the optical comb generator further comprising an optical comb generator output, the optical comb generator being adapted to perform four-wave mixing to generate an optical comb, the optical comb comprising a plurality of peaks,
        a peak selector comprising a peak selector input in optical communication with the optical comb generator output, the peak selector further comprising a peak selector output, wherein the peak selector includes an optical bandpass filter configured to isolate at least one of the plurality of peaks to produce a peak-selected optical comb signal, and
        a variable optical attenuator being in optical communication with the peak selector output, the variable optical attenuator being configured to attenuate the peak-selected optical comb signal to minimize an intermodulation product associated with the peak-selected optical comb signal and produce an attenuated peak-selected optical comb signal; and
    a detector comprising a first detector input in optical communication with the second splitter output and a second detector input in optical communication with the variable optical attenuator, the detector further comprising a signal output, the detector being adapted to produce an output radio-frequency signal based on the attenuated peak-selected optical comb signal and the second portion of the splitter optical signal.

2. The phase-modulated optical link of claim 1, wherein the phase encoder is adapted to receive an input radio-frequency signal through the signal input of the phase encoder.

3. The phase-modulated optical link of claim 1, wherein the first light source is a pulsed light source.

4. The phase-modulated optical link of 1, wherein the second light source is a continuous wave light source.

5. The phase-modulated optical link of claim 1, the optical link further comprising a tunable delay line positioned between and in optical communication with the second splitter output and the first detector input, the tunable delay line adapted to selectively adjust an optical path length between the second splitter output and the first detector input.

6. The phase-modulated optical link of claim 1, wherein the optical comb generator comprises a nonlinear optical fiber.

7. The phase-modulated optical link of claim 1, the distortion compensation element further comprising an amplifier positioned between and in optical communication with the first coupler output and the optical comb generator input.

8. The phase-modulated optical link of claim 1, wherein the peak selector comprises an optical filter.

9. The phase-modulated optical link of claim 1, wherein the detector comprises an interferometer and a photodiode.

10. The phase-modulated optical link of claim 9, wherein the interferometer is a Mach-Zehnder interferometer.

11. The phase-modulated optical link of claim 1, wherein the detector is adapted to output the output radio-frequency signal through the signal output of the detector.

12. A phase-modulated optical link comprising:
a first light source comprising a first light source output, the first light source including a phase-modulated light source;
a second light source comprising a second light source output, the first light source output including a continuous-wave light source;
a phase encoder comprising a phase encoder input in optical communication with the first light source output, the phase encoder further comprising a signal input and a phase-encoded optical signal output;
a splitter comprising a splitter input in optical communication with the phase-encoded optical signal output, the splitter further comprising a first splitter output and a second splitter output, wherein the splitter is adapted to receive a splitter optical signal at the splitter input and provide a first portion of the splitter optical signal at the first splitter output and a second portion of the splitter optical signal at the second splitter output, the splitter optical signal being based on an optical signal of the phase-modulated light source;
a distortion compensation element comprising:
a first coupler comprising a first coupler input in optical communication with the first splitter output and a second coupler input in optical communication with the second light source output, the first coupler further comprising a first coupler output,
an optical comb generator comprising an optical comb generator input in optical communication with the first coupler output, the optical comb generator further comprising an optical comb generator output, the optical comb generator being adapted to perform four-wave mixing to generate an optical comb, the optical comb comprising a plurality of peaks,
a peak selector comprising a peak selector input in optical communication with the optical comb generator output, the peak selector further comprising a peak selector output, wherein the peak selector includes an optical bandpass filter configured to isolate at least one of the plurality of peaks to produce a peak-selected optical comb signal, and
a variable optical attenuator being in optical communication with the peak selector output, the variable optical attenuator being configured to attenuate the peak-selected optical comb signal to minimize an intermodulation product associated with the peak-selected optical comb signal and produce an attenuated peak-selected optical comb signal; and
a second coupler configured to combine the attenuated peak-selected optical comb signal with the second portion of the splitter optical signal, the second coupler comprising a second coupler input in optical communication with the variable optical attenuator and the second splitter output.

13. A method of compensating distortion in a phase-modulated optical link, the method comprising:
producing a first optical signal by a first light source comprising a phase-modulated light source;
producing a second optical signal by a second light source comprising a continuous-wave light source;
producing, by a phase encoder, a phase-encoded optical signal based on the first optical signal;
producing, by a splitter, a first portion of the phase-encoded optical signal and a second portion of the phase-encoded optical signal;
coupling, by a first coupler, the second optical signal and the first portion of the phase-encoded optical signal to produce a first coupler output signal;
generating, by an optical comb generator performing four-wave mixing, an optical comb seeded by the first coupler output signal, the optical comb comprising a plurality of peaks;
isolating, by a peak selector, at least one of the plurality of peaks to produce a peak-selected optical comb signal, the peak selector including an optical bandpass filter;
attenuating, by a variable optical attenuator, the peak-selected optical comb signal to minimize an intermodulation product associated with the peak-selected optical comb signal and produce an attenuated peak-selected optical comb signal; and
combining, by a second coupler, the attenuated peak-selected optical comb signal with the second portion of the phase-encoded signal.

* * * * *

UNITED STATES PATENT AND TRADEMARK OFFICE
CERTIFICATE OF CORRECTION

PATENT NO.        : 9,698,913 B2
APPLICATION NO.   : 14/733360
DATED             : July 4, 2017
INVENTOR(S)       : Mark Foster et al.

It is certified that error appears in the above-identified patent and that said Letters Patent is hereby corrected as shown below:

In the Applicant item (71), replace The John Hopkins University, Baltimore, MD (US) with
-- The Johns Hopkins University, Baltimore, MD (US) --

In the Assignee item (73), replace THE JOHN HOPKINS UNIVERSITY, Baltimore, MD (US) with
-- THE JOHNS HOPKINS UNIVERSITY, Baltimore, MD (US) --

Signed and Sealed this
Twenty-sixth Day of September, 2017

Joseph Matal
*Performing the Functions and Duties of the
Under Secretary of Commerce for Intellectual Property and
Director of the United States Patent and Trademark Office*